United States Patent
Tabuteau et al.

(10) Patent No.: US 8,770,656 B2
(45) Date of Patent: Jul. 8, 2014

(54) CHASSIS WITH RAISED REAR FLOOR AND METHOD OF ASSEMBLY

(75) Inventors: Pascal Tabuteau, Montigny le Bretonneux (FR); Thomas Mauduit, Voisins le Bretonneux (FR); Olivier Bisror, Le Plessis Robinson (FR)

(73) Assignee: Renault S.A.S., Boulogne-Billancourt (FR)

( * ) Notice: Subject to any disclaimer, the term of this patent is extended or adjusted under 35 U.S.C. 154(b) by 0 days.

(21) Appl. No.: 13/811,762

(22) PCT Filed: Jul. 11, 2011

(86) PCT No.: PCT/FR2011/051643
§ 371 (c)(1),
(2), (4) Date: Apr. 2, 2013

(87) PCT Pub. No.: WO2012/010769
PCT Pub. Date: Jan. 26, 2012

(65) Prior Publication Data
US 2013/0181486 A1      Jul. 18, 2013

(30) Foreign Application Priority Data
Jul. 23, 2010    (FR) ..................................... 10 56042

(51) Int. Cl.
*B60J 7/00*    (2006.01)

(52) U.S. Cl.
USPC ....................................................... 296/204

(58) Field of Classification Search
USPC ................ 296/204, 187.08, 193.07; 180/312; 280/124.109
See application file for complete search history.

(56) References Cited

U.S. PATENT DOCUMENTS

| 1,553,527 | A |   | 9/1925  | Hamel |
|-----------|---|---|---------|-------|
| 4,940,282 | A | * | 7/1990  | Townsend ..................... 296/204 |
| 5,219,439 | A | * | 6/1993  | Moore et al. ................. 296/35.1 |
| 5,660,428 | A | * | 8/1997  | Catlin ........................... 296/205 |
| 5,788,322 | A | * | 8/1998  | Wolf et al. ................... 296/181.4 |
| 6,431,641 | B2| * | 8/2002  | Miyasaka ............... 296/203.03 |
| 6,824,204 | B2| * | 11/2004 | Gabbianelli et al. .......... 296/205 |

(Continued)

FOREIGN PATENT DOCUMENTS

| DE | 199 50 165      | 4/2001  |
| DE | 10 2004 015 910 | 10/2005 |

(Continued)

OTHER PUBLICATIONS

U.S. Appl. No. 13/811,761, filed Mar. 12, 2013, Bisror, et al.

(Continued)

*Primary Examiner* — Kiran B Patel
(74) *Attorney, Agent, or Firm* — Oblon, Spivak, McClelland, Maier & Neustadt, L.L.P.

(57) ABSTRACT

A motor vehicle chassis includes two side rail members covered at the front by two lateral floor reinforcements, a rear central cross member and a transverse reinforcement which is welded to the two lateral floor reinforcements, and a floor having a seat-cushion support part. The chassis further includes a rear raiser welded to the rear central cross member and two lateral raisers welded respectively to each of the two lateral floor reinforcements. The seat-cushion support part of the floor is welded to the two lateral raisers, to the rear raiser and to the transverse reinforcement, so as to create a space for an energy reservoir under the seat-cushion support part of the floor.

8 Claims, 4 Drawing Sheets

(56) References Cited

U.S. PATENT DOCUMENTS

Figure 1:
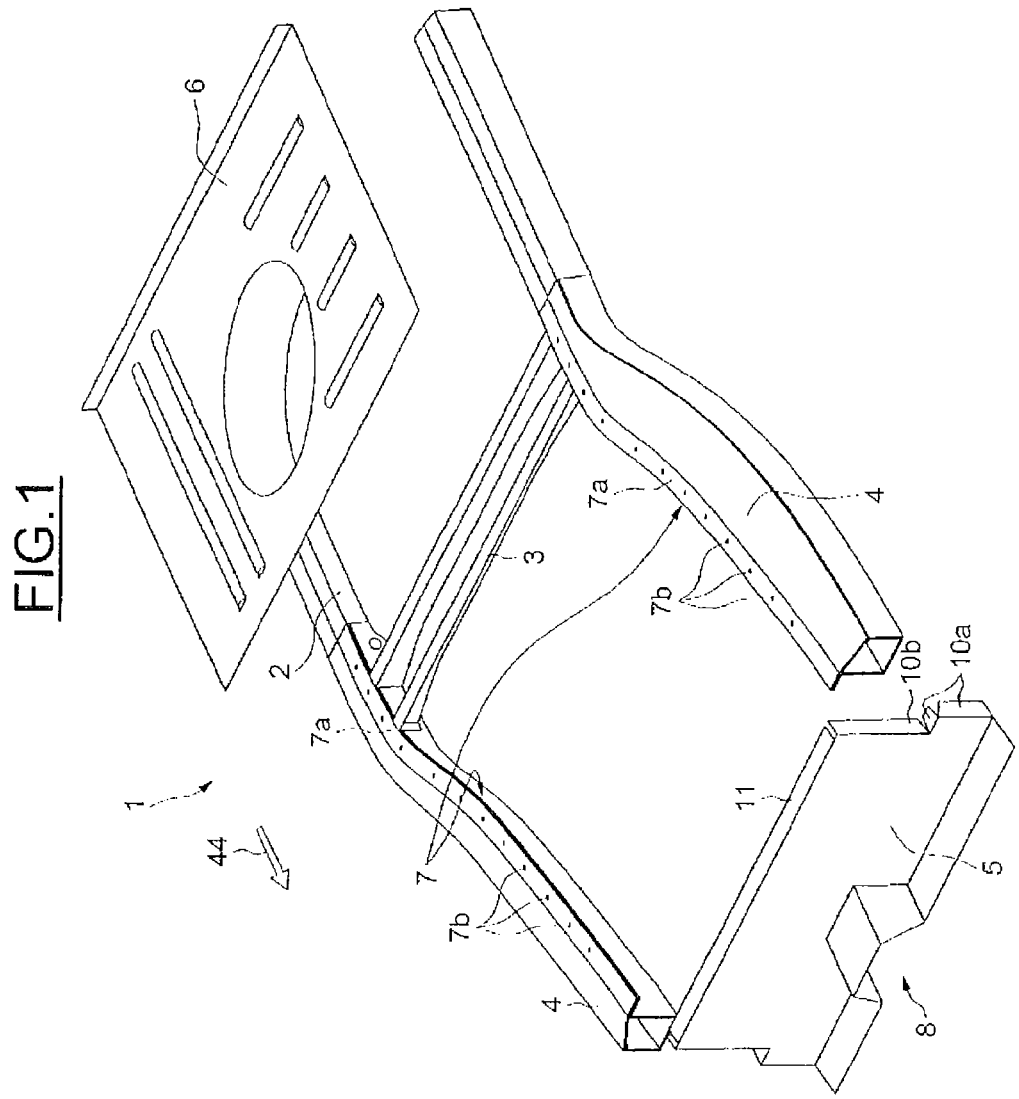

| | | | |
|---|---|---|---|
| 6,830,287 B1* | 12/2004 | Aghssa et al. | 296/187.11 |
| 7,216,924 B2* | 5/2007 | Li et al. | 296/187.12 |
| 7,810,875 B2* | 10/2010 | Gerisch | 296/193.07 |
| 8,235,156 B2* | 8/2012 | Koss | 180/89.12 |
| 8,287,035 B2* | 10/2012 | Bufe et al. | 296/203.01 |
| 8,534,706 B2* | 9/2013 | Adams | 280/785 |
| 2003/0030303 A1* | 2/2003 | Panoz | 296/204 |
| 2003/0047932 A1* | 3/2003 | Kawazu et al. | 280/830 |
| 2005/0104356 A1* | 5/2005 | Vincenti | 280/795 |
| 2006/0289224 A1 | 12/2006 | Ono et al. | |
| 2011/0241386 A1* | 10/2011 | Mildner et al. | 296/204 |
| 2013/0175826 A1* | 7/2013 | Bisror et al. | 296/193.07 |
| 2013/0175829 A1* | 7/2013 | Kim et al. | 296/204 |
| 2013/0181486 A1* | 7/2013 | Tabuteau et al. | 296/204 |

FOREIGN PATENT DOCUMENTS

| | | |
|---|---|---|
| DE | 10 2007 047 037 | 4/2009 |
| DE | 10 2008 059 682 | 6/2010 |
| JP | 7 156826 | 6/1995 |
| WO | 2010 098271 | 9/2010 |
| WO | 2011 001926 | 1/2011 |

OTHER PUBLICATIONS

U.S. Appl. No. 13/811,777, filed Apr. 4, 2013, Tabuteau, et al.
U.S. Appl. No. 13/811,808, filed Apr. 4, 2013, Mauduit, et al.
U.S. Appl. No. 13/811,750, filed Mar. 21, 2013, Bisror, et al.
French Search Report Issued Mar. 31, 2011 in Application No. FR 1056042 Filed Jul. 23, 2010.
International Search Report Issued Oct. 5, 2011 in PCT/FR11/051643 Filed Jul. 11, 2011.

* cited by examiner

CHASSIS WITH RAISED REAR FLOOR AND METHOD OF ASSEMBLY

The invention relates to the field of motor vehicle chassis, in particular electrically-driven or hybrid vehicles. In order to provide sufficient autonomy to the electrically-driven or hybrid vehicles, accumulator batteries have to be fitted. The volume of said batteries is substantially greater than that occupied by a conventional energy storage tank, such as for example a fuel tank.

One solution consists in making use of a defined volume below the passenger seats, by modifying the profile of the floor so as to isolate said volume from the passenger compartment. The passenger seats thus directly rest on a raised area of the floor. The height of the seats is able to be the same as in vehicles in the same range designed to be driven by an internal combustion engine, or may be higher.

The patent application JP 07 156 826 thus discloses a chassis structure for an electrically-driven motor vehicle, in which a volume below the front and rear passenger seats is reserved for the battery by separating said volume from the passenger compartment. Vertical raiser plates are positioned to the front and to the rear of the seats, a raised floor seat-cushion area extends between said vertical raiser plates and lateral raiser supports fixed to the lateral side portions of the bodywork.

Such a structure is not applicable to a three-door vehicle since it is necessary for the rear passenger seats to be bounded by fixed bodywork side portions, to which the lateral raiser supports are assembled. Moreover, where it is desired to provide the same vehicle as an electrically-driven model and as a model driven by an internal combustion engine, the line of the welding points, which make it possible to assemble the floor elements to the longitudinal members of the vehicle, may not have the same geometry for the electric vehicle and for the vehicle driven by an internal combustion engine. Thus, for the production of the two vehicles, it is necessary to put in position two separate welding lines which increases both the development and production costs.

The object of the invention is to propose a chassis geometry for an electric vehicle or for a further vehicle requiring an increased volume for the energy storage tank in comparison to conventional fuel tanks.

The object of the invention is also to propose a chassis geometry which makes it possible to produce at the same time electrically-driven vehicles and vehicles driven by an internal combustion engine, using a large number of shared components and production methods.

To this end, the invention proposes a motor vehicle chassis comprising two longitudinal members of U-shaped section which are covered and closed on a front part by two plates forming lateral floor reinforcements, and a rear central crossmember connecting the longitudinal members and flush in the region of the lateral floor reinforcements, the lateral reinforcements having an internal edge comprising a welding strip, characterized in that the chassis comprises a raised floor area forming both a seat and a housing for an energy storage tank, comprising a plate forming a seat-cushion support arranged above a raiser plate forming a transverse reinforcement and fixed by welding to the two lateral floor reinforcements, above a rear raiser part fixed by welding to the rear central crossmember and above two plates forming lateral raiser parts and each fixed by welding along one of the welding strips of a lateral reinforcement, the seat-cushion support part of the floor being fixed by welding to the two lateral raiser parts, to the rear raiser part and to the transverse reinforcement.

The housing thus formed below the seat-cushion support part is thus located at the front of the rear central crossmember, and is laterally bounded by the two lateral raiser parts.

The use of lateral raiser parts makes it possible to design all the elements which provide the raising of the floor without substantial modification to the process of assembly by means of welding. In particular, the arrangement of the welding lines provided along the lateral floor reinforcements in the case of a chassis of a vehicle driven by an internal combustion engine may be maintained for the assembly of the lateral raiser parts. Thus, the same automatic assembly line may be used to produce electrically-driven vehicles and vehicles driven by an internal combustion engine.

The floor may also have a rear part fixed by welding to the two longitudinal members and to the rear raiser part.

According to a further embodiment, the rear part of the floor may be fixed by welding to the two longitudinal members and to the rear central crossmember. In the two embodiments, the rear part of the floor is a separate part from the seat-cushion support part of the floor.

Advantageously, the seat-cushion support part of the floor has a front plate covering the transverse reinforcement and assembled to the transverse reinforcement by at least two weld beads so as to form a hollow body delimited by the front plate and the transverse reinforcement.

In this embodiment, the front plate and the transverse reinforcement may thus be fixed by a first welding line extending along the upper part of the seat-cushion support and may also be fixed by a second welding line extending along a lower edge of the front plate. In this manner, good rigidity of the front part of the housing of the energy storage tank is obtained. A front floor may also be assembled to the front plate and to the transverse reinforcement by the second welding line.

Preferably, the transverse reinforcement extends solely between the internal sides of the two lateral floor reinforcements. The raised area of the floor is thus independent of the lateral parts of the bodywork of the vehicle which makes it possible to use the same chassis both for three-door vehicles and for five-door vehicles.

According to a preferred embodiment, the rear raiser part comprises a vertical plate and a horizontal plate by which the fixing by welding to the rear central crossmember is carried out. A hollow reinforcing box structure is defined on the rear side by said horizontal plate, a plate forming a closing frame fixed by welding to the horizontal plate and an extension of the seat-cushion support part of the floor.

Advantageously, the hollow reinforcing box structure comprises, on the inside, at least one anchoring reinforcement fixed to the vertical plate of the rear raiser part and to the closing frame.

According to a further feature, in a method for assembling constituent elements of a motor vehicle chassis:
  a lower chassis part is provided, said lower chassis part comprising two longitudinal members covered at the front by two plates forming lateral floor reinforcements and comprising a rear central crossmember joining the longitudinal members and flush in the region of the lateral floor reinforcements, the lateral reinforcements having an internal edge comprising a welding strip,
  a raised floor area is assembled on said lower part, forming both a seat and a housing for an energy storage tank, by fixing by welding to the two lateral floor reinforcements a raiser plate forming a transverse reinforcement between said two lateral reinforcements, by fixing by welding to the rear central crossmember a rear raiser part, by fixing by welding two plates forming lateral raiser parts, each along one of the welding strips of a lateral reinforcement, and by assembling a plate forming a seat-cushion support of the floor by welding to the two lateral raiser parts, to the rear raiser part and to the transverse reinforcement, above the three raiser parts and above the transverse reinforcement.

Thus, the lines of the welding points, provided along the internal edge of the lateral floor reinforcements, may serve either for assembling a seat-cushion support part which is not raised, or for assembling the seat-cushion support part provided in the method, interposing the lateral raiser parts between the seat-cushion support and the lateral floor reinforcements.

According to a preferred embodiment, a rear floor part is fixed by being welded to the two longitudinal members and to the rear raiser part.

According to a further embodiment, it is possible to fix a rear floor part by welding to the two longitudinal members and to the rear central crossmember.

Preferably, a transverse reinforcement is used of a height substantially corresponding to that of the rear raiser part.

Figure 2:
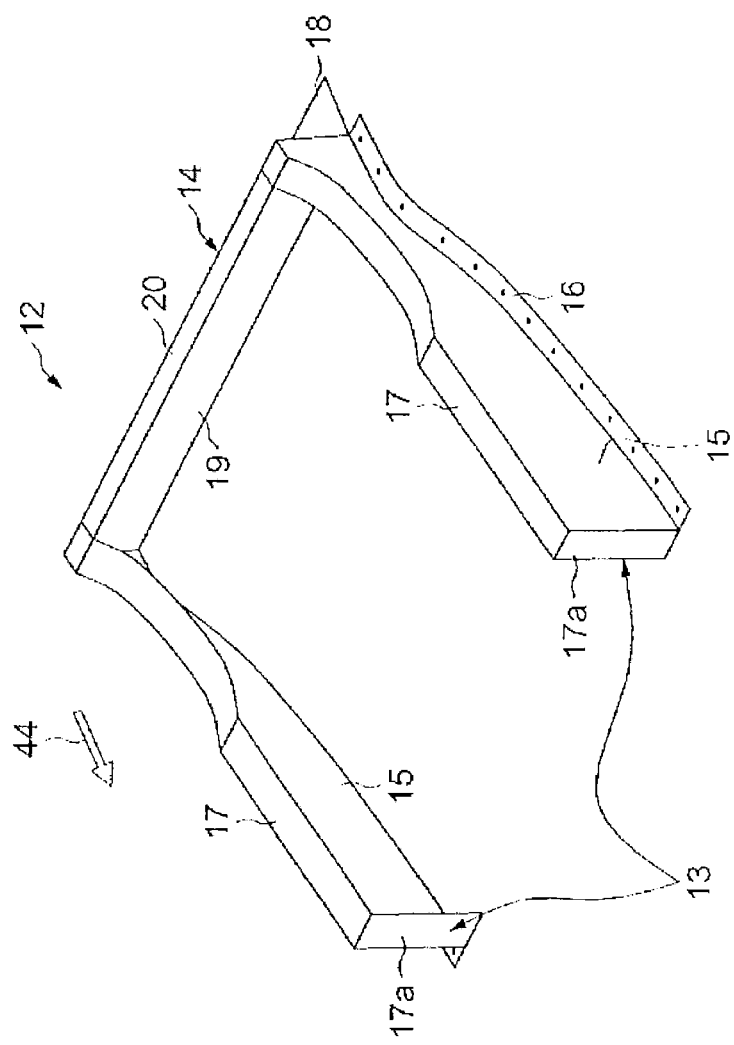
Figure 3:
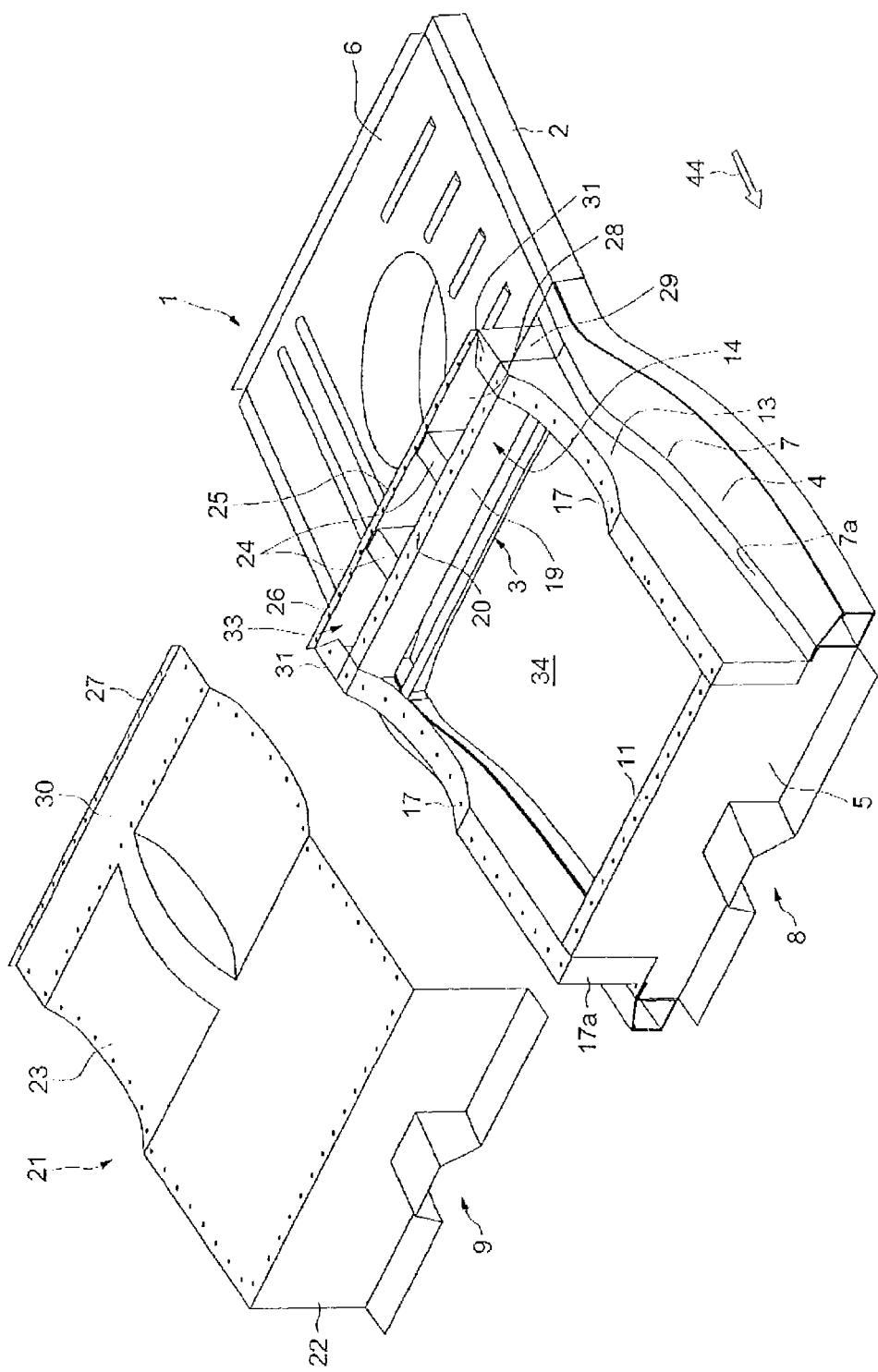
Figure 4:
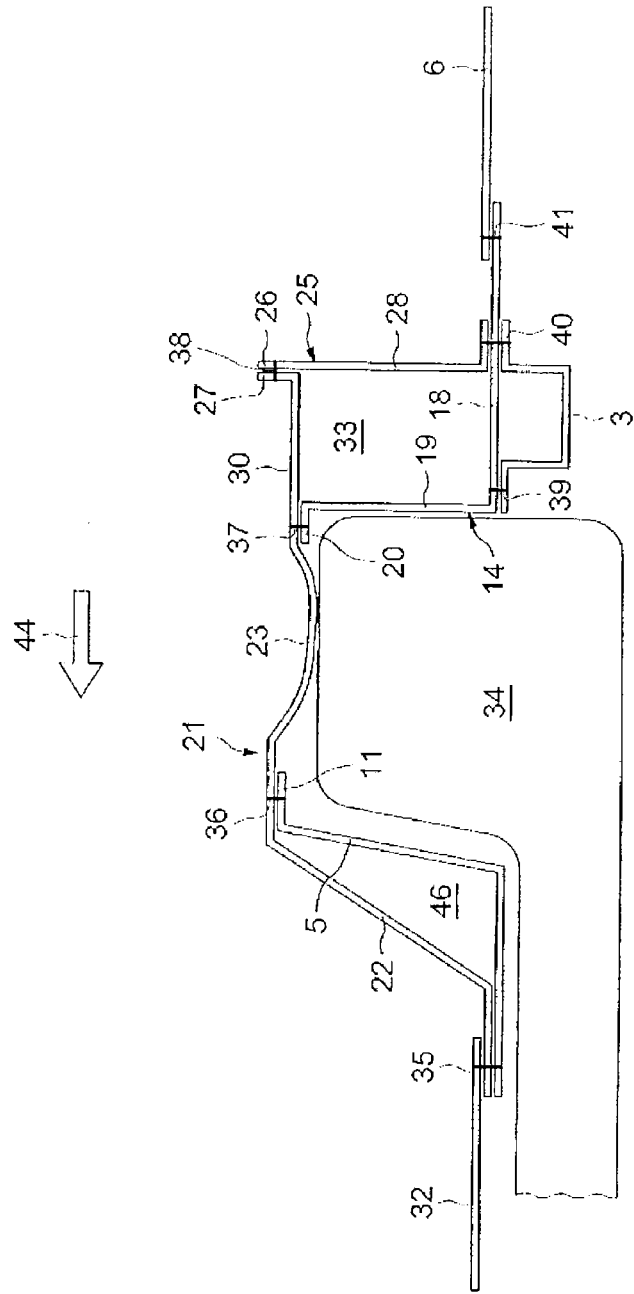

The present invention will be understood more clearly by reading the detailed description of several embodiments, taken by way of non-limiting example and illustrated by the accompanying drawings, in which:

FIG. 1 is a perspective exploded view of several elements of a chassis according to the invention, FIG. 2 is a perspective view of several elements of the chassis of FIG. 1 complementary to the elements present in FIG. 1, FIG. 3 is a perspective view of the partially assembled chassis of FIG. 1, FIG. 4 is a schematic sectional view of an assembled portion of the chassis of FIGS. 1 to 3.

The arrow 44 of FIG. 1 indicates the front of the vehicle (not shown), located to the left in FIGS. 1 to 4.

As illustrated in FIG. 1, a chassis 1 is delimited laterally by two longitudinal members 2 in the form of U-shaped beams, connected transversely by a rear central crossmember 3 also consisting of a U-shaped beam. The upper part of the longitudinal members 2 is closed at the front of the rear crossmember 3 by two lateral floor reinforcements 4. The lateral floor reinforcements 4 each consist of a sheet crimped in the substantially horizontal direction, rising toward the center of the vehicle, toward an internal edge 7 of the lateral reinforcement 4. The internal edge 7 of the lateral reinforcement 4 comprises a welding strip 7a able to be welded by being covered with a welding strip of a similar sheet and to be welded simultaneously with the internal edge of the longitudinal member 2. A line of welding points 7b is illustrated in FIG. 1 along the strip 7a and forms a guide line for an automatic welding tool (not shown).

A rear floor 6 is designed to be assembled to the top of the longitudinal members 2, at the rear of the rear crossmember 3. A transverse reinforcement 5 is in the form of a sheet crimped in a substantially vertical direction transversely to the axis of the vehicle, and in which a passage 8 is formed in the lower central part. The transverse reinforcement 5 has welding extensions 10a, 10b and 11 on its lateral and upper periphery making it possible to assemble the transverse reinforcement 5 to other sheet elements of the chassis 1.

The transverse reinforcement 5 is, in particular, provided with extensions 10a, making it possible for it to be assembled by being welded to the front ends of the lateral reinforcements 4 and the longitudinal members 2.

To produce a chassis designed for an electrically-driven vehicle, a raiser frame 12 shown in FIG. 2, consisting of two lateral raiser parts 13 and a rear raiser part 14, is assembled to the internal edges 7 of the lateral reinforcements 4 and to the rear crossmember 3. Each lateral raiser part 13 is a crimped and/or folded sheet portion having a substantially vertical side portion 15 bordered along its lower edge by a welding strip 16, the geometry thereof being complementary to that of the welding strip 7a of an internal edge of a lateral reinforcement 7 of FIG. 1. The height of the transverse reinforcement 5 is such that, after assembly to the lateral reinforcements 4 as illustrated in FIG. 3, the transverse reinforcement 5 protrudes considerably above the lateral reinforcements 4.

Each lateral raiser part 13 also has along its upper edge a welding strip 17 folded back substantially at right angles relative to the principal plane of the sheet. Each lateral raiser part 13 also has at its front end a vertical folded-back welding portion 17a. The raiser frame 12 further comprises a rear raiser part 14 made from a sheet folded so as to form a horizontal plate 18 capable of covering the rear crossmember 3 and supporting the front edge of the rear floor 6 and a vertical plate 19 capable of being welded along each of its vertical ends to one of the lateral raiser parts 13. The vertical plate 19 of the rear raiser part 14 comprises in the upper part a horizontal welding strip 20. The welding strips 17 and 20 of the raiser frame 12 thus make it possible to receive and to weld a floor seat-cushion support part 21 shown in FIG. 3. Elements common to FIGS. 1 and 2 are shown in FIG. 3, the same elements thus being denoted by the same reference numerals.

Assembled elements of the chassis of FIG. 1 are thus visible in FIG. 3. The transverse reinforcement 5 is assembled by welding the extensions 10a to the front parts of the lateral floor reinforcements 4 and the longitudinal members 2. The rear floor 6 is assembled by welding to the rear part of the longitudinal members 2. The raiser frame 12 is also seen in FIG. 2, assembled along its welding strips 16 to the welding strips 7a of the internal edges 7 of the lateral floor reinforcements 4. The raiser frame 12 is also assembled to the rear crossmember 3 by welding the horizontal plate 18 to said rear crossmember 3. The raiser frame is also welded to the lateral edges of the transverse reinforcement 5 along its folded welding portions 17a and along the welding extensions 10b of the transverse reinforcement 5. The transverse reinforcement 5, the lateral raiser parts 13 and the vertical plate 19 of the rear raiser part 14 thus make it possible to raise the seat-cushion support part 21 and thus delimit a volume 34 (visible in FIG. 4) which may be made available below the rear passenger seats. Said volume is closed in the upper part by the seat-cushion support part 21 of the floor, shown in an exploded view in FIG. 3. The seat-cushion support part 21 may, for example, be a crimped sheet. Said seat-cushion support part comprises in the upper part a closing cover part 23 on which the seat fittings (not shown) will be installed. The cover 23 is assembled along its periphery to the welding strips and welding extensions 11, 17 and 20, respectively belonging to the transverse reinforcement 5, to the lateral raiser parts 13 and to the rear raiser part 14.

The seat-cushion support part 21 also comprises a front plate 22 folded back downwards from the cover 23, capable of covering the transverse reinforcement 5 and in which a passage area 9 is also made, designed to nest on the passage 8 of the transverse reinforcement 5.

As illustrated in FIG. 3, the chassis 1 further comprises a sheet 25 forming the closing frame, comprising a vertical plate 28 parallel to the vertical plate 19 of the rear raiser part 14 and two lateral plates 29 arranged so as to define a hollow reinforcing box structure 33 between the rear sheet 25 and the rear raiser part 14. The seat-cushion support part 21 is extended to the rear by a support plate 30 which closes the upper part of the hollow reinforcing box structure 33. The support plate 30 is assembled to the rear raiser plate 14 along the welding strip 20 and is assembled to the rear closing sheet 25 along a vertical welding strip 26. Said support plate may also be assembled to the rear closing sheet 25 along welding strips 31 bordering the upper part of the lateral plates 29 of the closing sheet 25.

Two anchoring reinforcements 24 are assembled inside the hollow box structure 33 of the illustrated example. Each anchoring reinforcement 24 comprises a reinforcement sheet folded in a U-shape. The sheet is positioned so that the face forming the base of the U-shape of the reinforcement connects the upper edges of the rear part of the closing sheet 25 and the vertical plate of the rear raiser part 14. The ends of the reinforcing sheet corresponding to the ends of the U-shape are assembled to the horizontal plate 18 of the rear raiser part.

The anchoring reinforcements 24 are positioned, relative to a transverse axis of the vehicle, in the mounting region of the seat belts and the seats. The anchoring reinforcements 24 thus serve both to rigidify the hollow box structure 33 in order to improve the rigidity of the raised part of the floor and to transmit the forces from the seat belts or the mounting fittings of the passenger seats to the rear crossmember 3. Two anchoring reinforcements 24 are used in the illustrated example. It goes without saying that a different number of anchoring reinforcements could be envisaged, for example a single central reinforcement or 3 reinforcements or four reinforcements, etc.

FIG. 4 illustrates a schematic sectional view of the assembled chassis of FIG. 3. Elements common to FIGS. 1 to 3 may be seen in FIG. 4, the same elements thus being denoted by the same reference numerals. As illustrated in FIG. 4, a front floor part 32 and the rear floor 6 are located substantially at the same level, which is also the level that said floors could occupy in a vehicle driven by an internal combustion engine. The front floor area 32 is assembled along a welding line 35 of three thicknesses to the transverse reinforcement 5 and to the front plate 22 of the seat-cushion support part 21.

The front plate 22 and the transverse reinforcement 5 are also assembled in the upper part along the welding extension 11 of the transverse reinforcement 5. The front plate 22 and the transverse reinforcement 5 thus delimit a hollow body 46 which acts as a hollow beam and improves the rigidity, in the transverse direction of the vehicle, of the apron thus defined in front of the raised area.

As illustrated in FIG. 3, the cover 23 of the seat-cushion support part 21 is welded along its longitudinal edges to the upper welding strips 17 of the lateral raiser parts 13. It may be seen in FIG. 4 that said cover 23 is also welded along three transverse welding lines 36, 37 and 38. The welding line 36 is a welding line extending along the welding extension 11 of the transverse reinforcement 5. The line 37 is a welding line extending along the upper horizontal strip 20 of the rear raiser part 14, and the welding line 38 joins the vertical welding strips 27 and 26, respectively forming part of the edge of the support plate 30 and the closing frame 25.

A welding line 39 connects the edge of the horizontal plate 18 of the rear raiser part 14 to the front edge of the rear crossmember 3. A welding line 40 connects the horizontal plate 18 to a horizontal turned-back portion of the closing frame 25 and to the rear edge of the rear crossmember 3. A welding line 41 connects the rear floor 6 and an extension of the horizontal plate 18 protruding toward the rear of the closing frame 25 and the rear crossmember 3.

It should be noted that the welds formed along the welding strips 17, 7a, 20, 26 and the welding extensions 10a, 10b, 11 may be both continuous welding lines and spot welds.

The association of the hollow box structure 33 with the rear central crossmember 3 which is assembled there in a rigid manner makes it possible to obtain a transverse beam structure with good rigidity relative to the quantity of material used. The rear floor 6 could also be assembled to the rear edge of the rear central crossmember 3.

By the arrangement described in FIGS. 1 to 4, a volume 34 is made available below the rear passenger seats in which an energy storage tank, such as a set of accumulator batteries, or a pressurized fuel tank may be housed. The proposed structure makes it possible to keep the structure supporting the seats independent of the lateral edges of the bodywork and is thus suitable both for a three-door vehicle and a five-door vehicle.

Moreover, for the production of an electrically-driven vehicle said structure makes it possible to reuse a high number of parts which are also suitable for producing the chassis of a conventional vehicle driven by an internal combustion engine. For the production of a chassis for an electric vehicle and for the production of a chassis for a vehicle driven by an internal combustion engine, the structure also makes it possible to use the same welding lines for assembling a raised floor seat-cushion support area or a floor seat-cushion support area which is not raised to the lateral floor reinforcements.

The invention claimed is:

1. A motor vehicle chassis comprising:
    two longitudinal members of U-shaped section which are covered and closed on a front part by two plates forming lateral floor reinforcements; and
    a rear central crossmember connecting the longitudinal members and flush in a region of the lateral floor reinforcements;
    the lateral reinforcements including an internal edge comprising a welding strip;
    the chassis further comprising a raised floor area forming both a seat and a housing for an energy storage tank, comprising a plate forming a seat-cushion support arranged above a raiser plate forming a transverse reinforcement and fixed by welding to the two lateral floor reinforcements, above a rear raiser part fixed by welding to the rear central crossmember and above two plates forming lateral raiser parts and each fixed by welding along one of the welding strips of a lateral reinforcement, the seat-cushion support part of the floor being fixed by welding to the two lateral raiser parts, to the rear raiser part and to the transverse reinforcement.

2. The motor vehicle chassis as claimed in claim 1, wherein the floor further includes a rear part fixed by welding to the two longitudinal members and to the rear raiser part.

3. The motor vehicle chassis as claimed in claim 1, wherein the seat-cushion support part of the floor includes a front plate covering the transverse reinforcement and assembled to the transverse reinforcement by at least two weld beads so as to form a hollow body delimited by the front plate and the transverse reinforcement.

4. The motor vehicle chassis as claimed in claim 1, wherein the transverse reinforcement extends solely between the internal edges of the two lateral floor reinforcements.

5. The motor vehicle chassis as claimed in claim 1, wherein the rear raiser part comprises a vertical plate and a horizontal plate by which the fixing by welding to the rear central crossmember is carried out, a hollow reinforcing box structure being defined on the rear side by the horizontal plate, a plate forming a closing frame fixed by welding to the horizontal plate and an extension of the seat-cushion support part of the floor.

6. The motor vehicle chassis as claimed in claim 5, wherein the hollow reinforcing box structure comprises, on an inside, at least one anchoring reinforcement fixed to the vertical plate of the rear raiser part and to the closing frame.

7. A method for assembling constituent elements of a motor vehicle chassis comprising:
  providing a lower chassis part, the lower chassis part comprising two longitudinal members covered at the front by two plates forming lateral floor reinforcements and comprising a rear central crossmember joining the longitudinal members and flush in the region of the lateral floor reinforcements, the lateral reinforcements having an internal edge comprising a welding strip;
  assembling a raised floor area on the lower part, forming both a seat and a housing for an energy storage tank, by fixing by welding to the two lateral floor reinforcements a raiser plate forming a transverse reinforcement between the two lateral reinforcements, by fixing by welding to the rear central crossmember a rear raiser part, by fixing by welding two plates forming lateral raiser parts, each along one of the welding strips of a lateral reinforcement, and by assembling a plate forming a seat-cushion support of the floor by welding to the two lateral raiser parts, to the rear raiser part and to the transverse reinforcement, above the three raiser parts and above the transverse reinforcement.

8. The method as claimed in claim 7, wherein a rear floor part is fixed by being welded to the two longitudinal members and to the rear raiser part.

* * * * *